(12) United States Patent
Ahuja

(10) Patent No.: US 7,950,061 B2
(45) Date of Patent: May 24, 2011

(54) COPY-PROTECTED AUDIO, VIDEO AND OR DATA OPTICAL DISK

(76) Inventor: Om Ahuja, Antioch, TN (US)

(*) Notice: Subject to any disclaimer, the term of this patent is extended or adjusted under 35 U.S.C. 154(b) by 1497 days.

(21) Appl. No.: 11/257,353

(22) Filed: Oct. 24, 2005

(65) Prior Publication Data

US 2006/0087942 A1    Apr. 27, 2006

Related U.S. Application Data

(60) Provisional application No. 60/620,818, filed on Oct. 22, 2004.

(51) Int. Cl.
*H04N 7/16* (2006.01)
*G11B 5/86* (2006.01)
*G11B 11/00* (2006.01)
*G06F 7/04* (2006.01)

(52) U.S. Cl. ............... 726/26; 369/47.12; 369/53.21

(58) Field of Classification Search .............. 726/26; 369/47.12, 53.21
See application file for complete search history.

(56) References Cited

U.S. PATENT DOCUMENTS

2004/0103301 A1* 5/2004 Inokuchi et al. ............ 713/200
2005/0172122 A1* 8/2005 Risan et al. ................. 713/165
2005/0177516 A1* 8/2005 Vandewater et al. .......... 705/57
2006/0117314 A1* 6/2006 Sato ............................. 717/174
2006/0123483 A1* 6/2006 Cohen ........................... 726/26

FOREIGN PATENT DOCUMENTS

WO    WO 02075735 A1 *  9/2002

OTHER PUBLICATIONS

Halderman, J. Alex. "Analysis of the MediaMax CD3 Copy-Prevention System", Oct. 2003.*

* cited by examiner

*Primary Examiner* — Michael J Simitoski
(74) *Attorney, Agent, or Firm* — Scott W Houtteman; Kile Park Goekjian Reed & McManus, PLLC

(57) ABSTRACT

Copy-Protected Audio, Video and or Data Optical Disk and the Protection Process for such Disk includes a TSR (Terminate and Stay Resident) program which when once installed onto a computer system blocks any attempt to copy any designated Audio, Video or any Data on such Copy-Protected Optical Disk and or the Hard Drive. Additionally this system further includes a means of an optional Password Key which could be a Key Floppy or any suitable media. Optionally the password could be obtained by logging-on to an Internet based authentication terminal that unlocks the system and allows access to the stored contents on the disk for the first time user of the Copy-Protected Optical Disk thus increasing the pay per use revenues for Audio, Video and or Software Sales, Registration and or Rentals.

23 Claims, 3 Drawing Sheets

COPY-PROTECTED AUDIO, VIDEO AND OR DATA OPTICAL DISK

CROSS-REFERENCE TO RELATED APPLICATIONS

Applicant claims the benefit of a Provisional Patent Application No. 60/620,818 filed Oct. 22, 2004. Titled: Copy-Protected Audio, Video and or Data Optical Disk and the Protection Process for such Media.

BACKGROUND OF THE INVENTION

The invention relates to audio, video, and or data Copy-Protected CD/DVD Optical Storage Disks. Currently these CD/DVD are very easily copied using any of the commercially available CD/DVD Burners. Thus due to the piracy of these products, etc., there are measurable substantial losses of revenues for the artists and producers of these audio, video, and or data CD/DVDs.

Upto now there has been no reliable means of copy protection software and or a process that would provide copy-protection to prevent the illegal or unauthorized copying (piracy) of these optical disks or for the Designated Data once resident on the hard drive.

DESCRIPTION OF THE PRIOR ART

As is well known in the entertainment and the software industry, creative artists and the developers of software products suffer a considerable financial loss due to the illicit copying of the said products (also known as "piracy"). This situation is further aggravated by the easy availability of optical disk recorders and CD/DVD writers that copy such CD and DVD optical media relatively quickly and inexpensively. Such devices can make perfect copies of any given original digital information. Thus despite obvious advantages of any digital media such as the CDs/DVDs there remains this drawbacks in the use of such Compact Discs (CD/DVDs). Selling any newly developed audio, video and or data digital property (including but not limited to software packages) caries with it the risk of it being copied directly either on the Hard Disk drive and or other media.

OBJECT & THE SUMMARY OF THE INVENTION

The present invention overcomes these above mentioned disadvantages and makes full use of the TSR (Terminate and Stay Resident) program which when once installed on the computer system blocks any attempt to copy any Copy-Protected Disk and or its contents i.e. the TSR keeps track of any Designated Digital Data stored onto the System and any attempt to copy any of the designated data is thawed by the TSR, (including but not limited to the EXE Files, Audio and or the Video Data thereon).

The TSR may not and cannot be uninstalled once it has been installed onto the system without an especially designed uninstaller, which first force deletes the said designated data copied onto the system before it uninstalls the TSR.

The TSR additionally Monitors any of the Networking Environment wherein it even thaws any attempt to remotely copy or access any of the Protected Designated Data. The TSR issues a Copy Right Warning Notice to both the local and the remote system and disconnects the two after warning the user.

Yet another inbuilt feature of the TSR is that it is self replicating . . . any accidental or intentional attempt to locally or remotely delete the TSR without its own authorized authentic uninstaller, does NOT and will not delete it off the system it is installed on. Furthermore, by adding the above means to any known prior art, it is an object of the present invention to add the TSR (Terminate and Stay Resident) program method of copy protection to any optical record carrier, by additionally creating a key on the original optical record carrier which cannot be copied on to another record carrier (media) means. By extracting the key off of the original optical record carrier one distinguishes between an original record carrier and an attempted copy of an original optical record carrier. Thus it is an object of the present invention to provide a superior all combined optical record carrier that has a secure multifaceted total copy protection.

DESCRIPTION OF THE PREFERRED EMBODIMENTS

Figure 1:
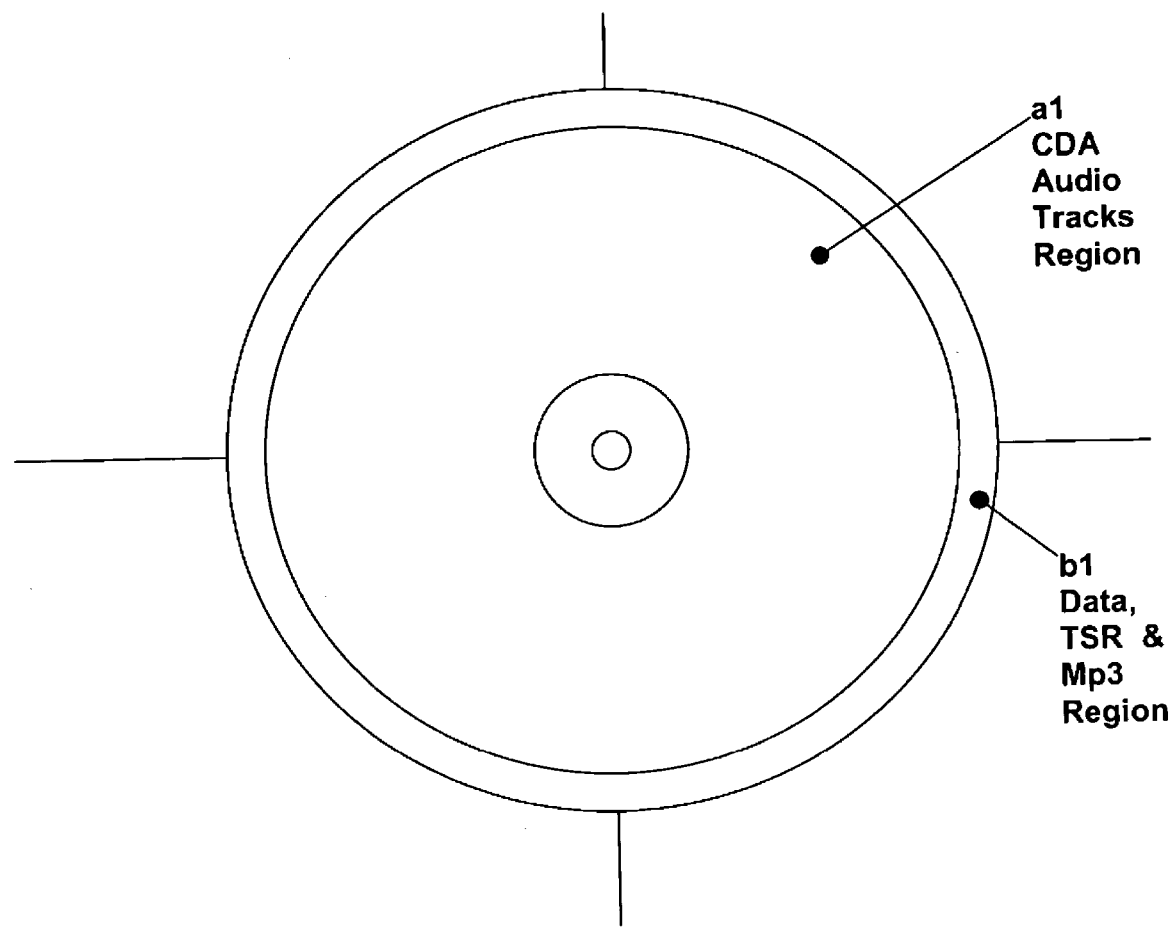
FIG. 1 shows an Audio-Data CD showing the first embodiment of this system in accordance with this invention.

FIG. 1 shows an Audio-Data CD showing the first embodiment of this system in accordance with the invention. (a1) represents the area where the Audio Data is stored. In a typical Audio CD this is in CDA Data Format. This recording plays normally on any standard Audio CD Player.

(a2) represents an area where Data and Programs may be stored and or written in accordance with this present invention. Specifically an "Autorun.ini" automatically runs an initial program and verifies the presence of a preinstalled TSR (Terminate and Stay Resident) on the system, and if none is found on the System it asks the user for permission to install the said TSR on to the System.

Figure 2:
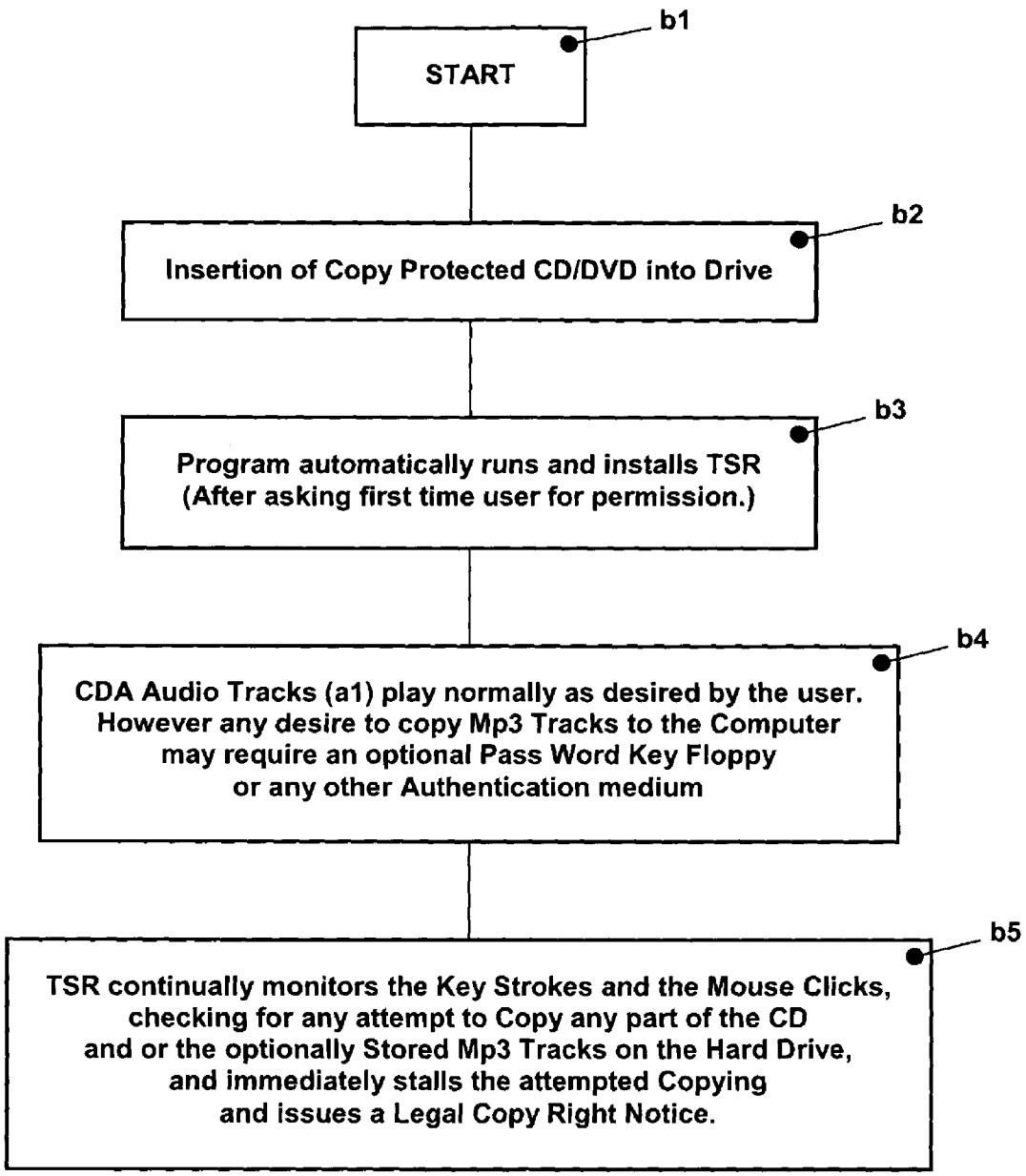
FIG. 2 shows the flowchart of the preferred embodiment.

At this time it also as soon as the Copy Protected CD/DVD is inserted into the Computer for the first time. Prior to installing itself the Program ask for permission and requires that the user chooses to install the TSR. If the User "Declines Permission to install the TSR, the program automatically ejects the CD/DVD Tray and issues a warning that the CD/DVD Tray has been ejected and simultaneously displays a Copy Protection Warning. Once the TSR has been installed on to the system, the TSR (the program) automatically detects any of the designated Copy Protected CDs as soon as they are inserted into the CD/DVD Tray. One such means includes recognizing (detecting) a unique "Icon.ico" as part of the Files in the Data Area; furthermore any such unique and or designated means may be used to help the TSR recognize that a Copy Protected CD/DVD has been inserted into the CD/DVD Tray. Therein after any attempt to access or copy the data area or any part of the CD is automatically and instantly aborted by the ejection of the CD/DVD Tray. The TSR continuously monitors the user Key Strokes and the Mouse Clicks and automatically aborts any attempt to copy or write any audio and or video files or any Digital Data to be Protected. Thus any unauthorized illegal attempt to copy any of the Copy Protected digital material(s) is immediately aborted by the said installed TSR, and a Copy Protection Warning (Legal Notice) is issued to the user of the System FIG. 2 Shows the Flowchart of the Preferred Embodiment.
As soon as the Copy Protected CD/DVD is inserted into the Computer for the first time. "Autorun.ini" automatically runs and initial program and first checks to see if the said TSR (Terminate and Stay Resident) is already installed on the system. If not then it asks the user for permission to install the TSR on to the system. The Program freezes up the System (The KEY Board and the Mouse) until the user accepts or decline the installation of the TSR. If the User declines the installation of the TSR the program automatically ejects the CD/DVD and displays a warning that the CD/DVD Tray has been ejected and at the same time it unfreezes the System.

After the installation of the TSR, the initial program unfreezes the System. And the TSR begins its task of monitoring the presence of a Copy Protected CD/DVD in the CD and or the DVD Tray and continuously monitors the Keystroke and the Mouse Movements and Mouse Clicks for any attempt to copy or write any of the Copy Protected Materials on or off the Copy Protected CD/DVD and aborts that action immediately and issues a Copy Protected Material Legal Notice to the user.

In FIG. 2 the CDA Audio Track (b4) (a1 in FIG. 1) plays normally as desired by the user when the CD is inserted in any standard Audio CD Player.

Upon Insertion of a Copy Protected CD into a Computer the "Autorun.ini" runs the initial program which first checks for an installed version of a Copy Protection TSR already installed on the System. If the Initial Program detects a previously installed TSR on the System, it checks for it version and automatically updates, installs the most current version of the TSR onto the System.

However Upon the very First Time Insertion of the Copy Protected CD into a Computer the "Autorun.ini" first requires the user to allow the installation of the TSR onto the System. If the user "Declines Permission to install the TSR, the program automatically ejects the CD/DVD Tray and issues a warning that the CD/DVD Tray has been ejected and simultaneously displays a Copy Protection Warning.

After the TSR has been installed the Programs plays the Mp3 version (of the same CDA Audio Tracks) stored in the Audio Data (CDA Format) Section of the CD. The System even allows the copying of the Mp3 Tracks on to the Computer for playing the Tracks without the CD in the Tray. Depending on the Record Producer the System may require an optional One Time Use only Pass Word Key Floppy and or any other comparable means of Authentication before the Mp3 Files are copied on the System. Dependent on the Producer the password Key means may be useable "n" number of times.

First requires the user to allow the installation of the TSR onto the System. After the TSR has been installed the Programs plays the Mp3 version (of the same CDA Audio Tracks) stored in the Audio Data (CDA Format) Section of the CD.

Thus a rented Copy protected Audio/Video CD may be authorized for "n" number of times of use only with the accompanying Key Floppy (or any authentication device such as a Memory Stick).

However at any time, any attempt to copy any part of the Copy Protected CD is thawed by the resident TSR program.

(b5) Once the TSR has been installed, it continues to monitor any attempt to Copy any Copy Protected CD/DVD or any of the Copy Protected files and folders stored on the Hard Drive i.e. the Mp3, etc., in any variation of their relevant formats.

Thus ALL Audio, Video, Photo and Data (CDs, VCDs, SVDs, DVDs including any Software CDs/DVD(s), Photo Image(s) etc.) may be protected by defining and allocating to the TSR all that is to be Copy Protected.

Figure 3:
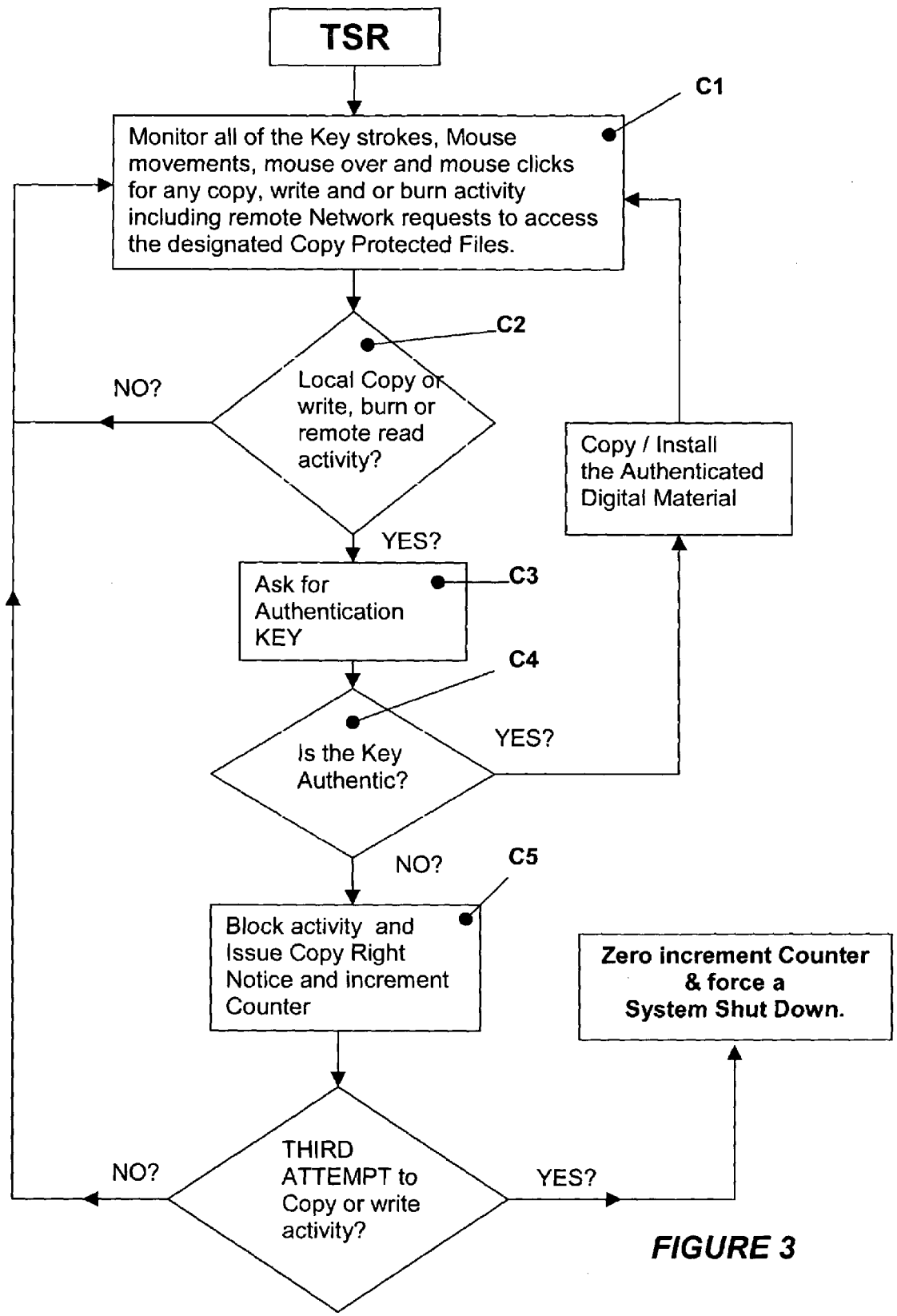
FIG. 3 shows the flowchart of the TSR for Copy Protection.

FIG. 3 represent the basic function of the TSR. (C1) Once installed on the system it continuously monitors for all of the Key strokes, mouse movements, mouse over and mouse clicks for any copy, write and or burn activity including remote Network requests to access any of the designated Copy Protected Files.

(C2) If the TSR detects any attempt to Copy write, or burn or if it detects any request to read any of the designated Copy Protected Files, it blocks the illegal (unauthorized) activity and issues a Copy Right (Notice) Warning (C5). At this time it also increments an internal Counter for the number of times an illegal attempt to copy was made. After the third time (or "n" number of times) it forces the user to save all opened documents and applications and Reboot the System. At this time it also resets the internal counter.

This in essence discourages any illegal copying of any of the Digital Material to be copy protected. However in case there is a need for the installation or copying on to the system the TSR asks for a valid Authentication Key (C3). After installing the Digital Material to the Hard Drive . . . (such as Mp3 Songs . . . ) it is also considered as Copy Protection Designated Material and is hence monitored by the TSR also for any attempt to copy it or write it to a CD.

This invention is not restricted nor limited to any specific format of the wide variety of optical storage media, i.e. Audio Data, Computer Data, Video Data or any forms of combinations thereof; it is rather applicable to any form of storage media that has or launches an "*.ini" File that automatically runs an "*.exe" File or any program designated by the "*.ini" File. Thus ALL Audio, Video, Photo and Data (CDs, VCDs, SVDs, DVDs including any Software CDs/DVD(s), Photo Image(s) etc.) may be protected by defining and allocating to the TSR all that is to be Copy Protected.

Additionally to better overcome the problem of unauthorized copying this System may use Watermarking and be further enhanced by the use of any of the other known optical disk copy protection systems including but not limited to the CD track optical schemes to increase the anti-piracy protection feature of the present system.

The invention is notably applicable to CD-ROM and DVD-ROM type Optical Disks but not limited thereto. Furthermore after the installation of the TSR (Terminate and Stay Resident) Software onto the computer, the copy protection software prevents any illegal copying of any Copy Protection Designated Files, Folders and Data (including but not limited to exe. audio, video, image and or data files in any digital format (and or in their respective varied formats). As long as the TSR has been once activated, a Global Copy Protection may just as easily be installed in that any activity on any of the Audio, Video, and or Data that needs to be Copy Protected can be Copy Protected even if the same is stored on the Hard Drive.

I claim:

1. A product for preventing unauthorized copying of computer readable data comprising:
   a computer comprising a program installed on the computer, said program comprising code that when executed implements:
   a self preserving function that executes multiple identical copies of said program concurrently, wherein an attempt to shutdown or delete a first copy of the multiple copies results in one of the other copies restoring the first copy, wherein the program cannot be uninstalled without an uninstaller specifically designed for uninstalling said program,
   a detection function detecting attempts to copy any copy-protected computer readable data, a blocking function blocking said attempts to copy any copy-protected computer readable data thereby preventing unauthorized copying.

2. The product as defined in claim 1 wherein said attempts to copy any copy-protected computer readable data are detected by monitoring requests to access said copy protected computer readable data.

3. The product as defined in claim 2 wherein said monitoring is selected from the group consisting of: monitoring the user's key strokes, monitoring the user's computer mouse input and monitoring remote network copy requests.

4. The product as defined in claim 1 wherein said copy protected computer readable data is selected from the group consisting of: computer programs, EXE files, audio files, video files, image files and data files.

5. The product as defined in claim 1 further comprising a storage medium comprising a copy of said program; said storage medium copy further comprises an installer for installing a copy of said program on said computer.

6. The product as defined in claim 5 wherein said storage medium further comprises a copy of said uninstaller.

7. The product as defined in claim 5 wherein said storage medium is an optical disk including at least one spiral track.

8. The product as defined in claim 7 wherein said optical disk is selected from the group consisting of: a CD and a DVD.

9. The product as defined in claim 1 wherein said self preserving function further comprises the function of restoring deleted copies of said program.

10. The product as defined in claim 1 wherein said attempts to copy further comprise remote network requests to copy any copy-protected data.

11. The product as defined in claim 1, wherein the computer is configured to require user permission to install the program.

12. The product as defined in claim 1, wherein the program is installed on said computer's hard drive.

13. A method of preventing unauthorized copying of computer readable data comprising:
    installing a program on a computer,
    running multiple identical copies of said program concurrently wherein an attempt to shutdown a first copy results in one of the other copies of the program restoring function of the first copy,
    wherein execution of the program performs the steps of:
        detecting attempts to copy any copy-protected computer readable data, and;
        blocking said attempts to copy any copy-protected computer readable data,
        wherein said blocking of copy attempts prevents unauthorized copying of computer readable data and uninstallation of the program requires a specially designed uninstaller.

14. The method as defined in claim 13 wherein said program detects said copy attempts by monitoring requests to access said copy protected computer readable data.

15. The method as defined in claim 14 wherein said monitoring is selected from the group consisting of: monitoring the user's key strokes, monitoring the user's computer mouse input and monitoring remote network copy requests.

16. The method as defined in claim 13 wherein said copy protected computer readable data is selected from the group consisting of: computer programs, EXE files, audio files, video files, image files and data files.

17. The method as defined in claim 13 further comprising using an installer for installing a copy of said program on said computer, wherein the installer and said copy of said program are stored on a storage medium.

18. The method as defined in claim 17 wherein said storage medium further comprises a copy of said uninstaller.

19. The method as defined in claim 17 wherein said storage medium is an optical disk including at least one spiral track.

20. The method as defined in claim 19 wherein said optical disk is selected from the group consisting of: a CD and a DVD.

21. The method as defined in claim 13 wherein said attempts to copy further comprise remote network requests to copy any copy-protected data.

22. The method as defined in claim 13, further comprising the step of receiving user permission for said installing.

23. The method as defined in claim 13, wherein the program is installed on said computer's hard drive.

* * * * *